Feb. 17, 1942.   P. W. G. NIELSON   2,273,369
METAL-TURNING-LATHE ATTACHMENT
Filed June 24, 1940
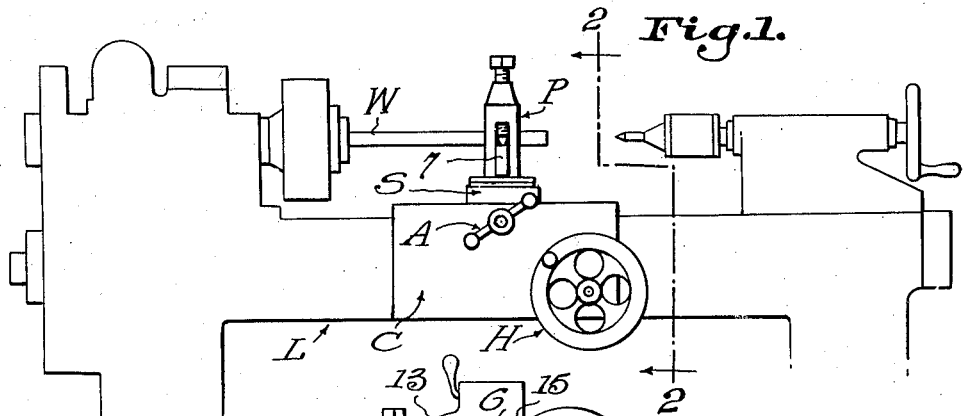
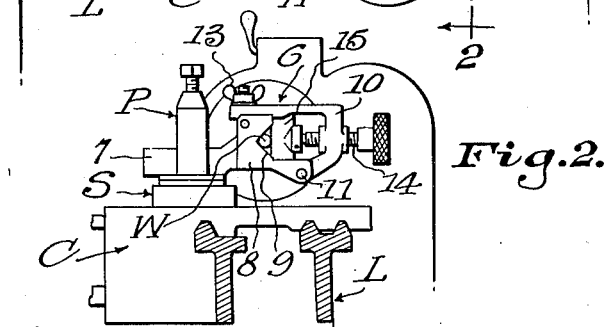
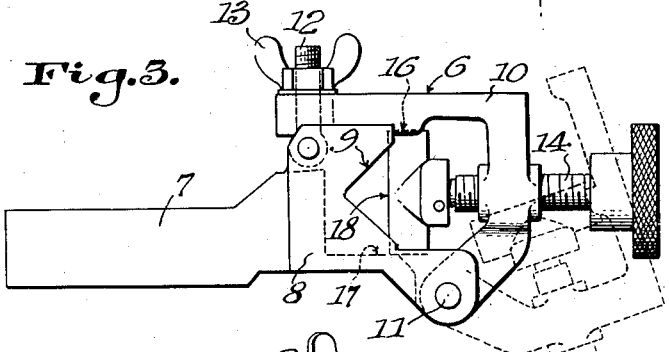
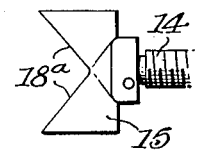
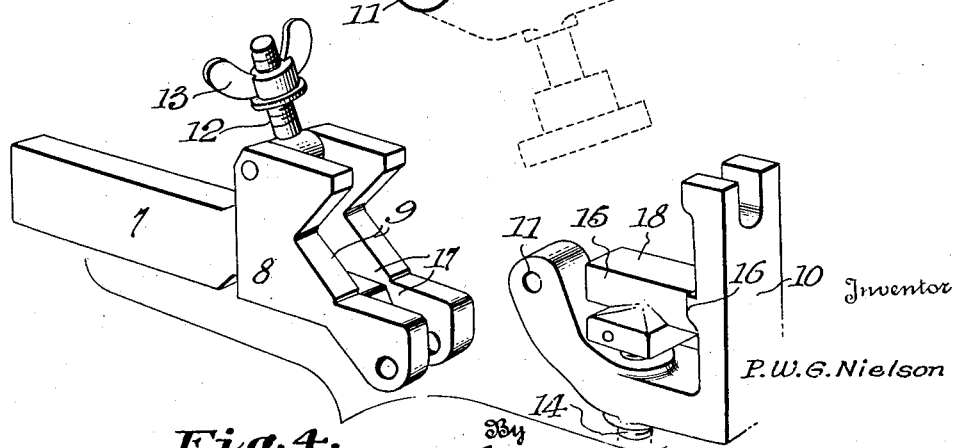
Inventor
P. W. G. Nielson
By H. B. Willson & Co.  Attorneys
Witness H. Woodard Patented Feb. 17, 1942

2,273,369

UNITED STATES PATENT OFFICE 2,273,369

METAL-TURNING-LATHE ATTACHMENT

Pontus W. G. Nielson, Greensboro, N. C.

Application June 24, 1940, Serial No. 342,161

1 Claim. (Cl. 82—39)

The invention relates to attachments used on ordinary metal-turning lathes for centering the work and bracing same while performing such operations as filing, polishing, and center-drilling, for example, on rods, screws, shafts and the like. Heretofore, attachments of this general nature have usually been attachable directly to the lathe bed, have been comparatively large and cumbersome, and have been difficult to attach, detach and positionally adjust. My invention, however, aims to provide a new and improved and easily handled work-centering and bracing device which is provided with a supporting shank substantially duplicating the shank of an ordinary lathe tool and having the same function. Thus, by means of the customary adjustments already on any lathe for adjusting the lathe carriage, tool post slide, and tool post, the device may be positionally adjusted with respect to the work, with ease. Moreover, it may be attached and detached as easily as a common lathe tool and may be kept in almost as little space.

Figure 1 of the drawing is a more or less diagrammatic front elevation of a conventional metal-turning-lathe showing the attachment in place for centering and bracing a rod driven by the lathe.

Figure 2 is a transverse sectional view on line 2—2 of Fig. 1.

Figure 3 is an enlarged side elevation.

Figure 4 is a disassembled perspective view.

Figure 5 is a fragmentary side elevation showing a slight variation over the structure shown in the preceding views.

A preferred construction has been illustrated and will be rather specifically described, with the understanding, however, that within the scope of the invention as claimed, variations may be made.

The centering and bracing means is indicated in a general way by the reference character 6 and its construction may, of course, vary in numerous ways, the only real essentials being that it be provided with means for holding the work centered and preventing lateral springing or whipping thereof while the work is being driven for filing, polishing, etc.

A single inherently rigid horizontal shank 7, extending directly forward from the work centering and bracing means 6, is provided to support said work centering and bracing means 6, said shank being for all intents and purposes a duplicate of the shank of any ordinary lathe tool. Thus, the entire attachment may be attached and detached just as quickly and easily as an ordinary tool, and may be positionally adjusted with respect to the work, with equal ease, the conventional adjustments already on any lathe being utilized in making the required positional adjustment of the attachment. In this regard, attention is invited to Fig. 1 showing the shank 7 held in the usual slotted tool post P of a conventional metal turning lathe L and secured in the slot of said tool post by the usual set screw of said post. The tool post slide is indicated at S and its adjusting means at A, said slide S and adjusting means A being on the usual carriage C which is adjustable in the usual way by means of the hand wheel H. Thus, the entire attachment may be quickly and easily secured in place and adjusted with respect to the work W simply by utilizing conventional parts of the lathe. Moreover, the attachment may be detached with rapidity and ease and kept in almost as little space as that required for an ordinary lathe tool. Of course, after positional adjustment of the attachment with respect to the work, the attachment itself must be adjusted for proper contact with said work, and due to the construction described below, only simple operations are here performed.

I have illustrated a head 8 integral with the rear end of the shank 7 and having a V-shaped notch 9 in its front end, providing for two-point contact with the work W. An inverted L-shaped yoke 10 is pivoted at 11 at its lower end to the lower rear portion of the head 8 to cooperate with said head in surrounding the work. Any suitable means such as a swing bolt 12 and wing nut 13 are provided for securing the upper end of the yoke 10 to the head 8. This yoke carries a manually operable screw 14 upon which is swiveled a jaw 15, said jaw being slidably engaged with one guide-way 16 in the upper arm of the yoke 10, and with another appropriate guideway 17 in the lower rearwardly projecting portion of the head 8. The jaw 15 may be provided with a flat inner surface 18 as in most of the views, or with a V-shaped notch 18ª as in Fig. 5. In either instance, the surface or surfaces of the jaw 15 and the surfaces of the head 8 cooperate with each other in holding the work W centered while it is being driven for the performance of any desired operation.

After clamping the shank 7 in the tool post P, the entire attachment is positionally adjusted with respect to the work W until the head 8 is in proper engagement with the work, the yoke 10 being in open position preferably while making this positional adjustment. The yoke is then closed and fastened, and the screw 14 is adjusted until the jaw 15 properly engages the work. In positionally adjusting the device to the work, the lathe-carriage C is moved toward the head stock of the lathe so that the head 8 may be brought into contact with the work just as close as possible to the chuck or other work-driving means, at which point, there is no danger of the work being off-center and thus causing inaccurate initial setting of the attachment.

From the foregoing, taken in connection with the accompanying drawing, it will be seen that novel and advantageous provision has been made for carrying out the object of the invention. While preferred details have been disclosed, attention is again invited to the possibility of making variations within the scope of the invention as claimed. Although the invention has been described as a work-centering device, it will be obvious that it could be used as a tool-centering and bracing device, if the tool is to be held by the tail stock and the work driven by the head stock. A tool-guiding bushing could well be held by the device if desired.

I claim:

A metal-turning-lathe attachment comprising a shank engageable with the ordinary tool post of a lathe, a head rigidly secured to the rear end of said shank, said head having a rearwardly open V-shaped notch and a lower portion projecting rearwardly beyond said notch, an inverted L-shaped yoke cooperable with said head in surrounding the work, the lower end of said yoke being pivoted to said rearwardly projecting lower portion of said head, means for releasably securing the upper end of said yoke upon said head, a screw threaded forwardly through the lower vertical arm of said yoke, and a jaw swiveled on the front end of said screw for coaction with said V-shaped notch in centering and bracing the work, the upper horizontal arm of said yoke being provided with a guideway with which the upper end of said jaw is permanently engaged slidably, said rearwardly projecting lower portion of said head being provided with a second guideway which is slidably engaged by the lower end of said jaw when said yoke is secured in operative position, said lower end of said jaw being swingable from said second guideway when the yoke, screw and jaw are swung rearwardly from said head.

PONTUS W. G. NIELSON.